(12) United States Patent
Venkatanarayanan et al.

(10) Patent No.: US 7,469,313 B1
(45) Date of Patent: Dec. 23, 2008

(54) METHODS AND SYSTEMS FOR PRESERVING DISK GEOMETRY OF VIRTUALIZED DATA VOLUMES

(75) Inventors: Prakash Venkatanarayanan, Milford, MA (US); Helen S. Raizen, Jamaica Plain, MA (US); Michael E. Bappe, Loveland, CO (US); Arieh Don, Newton, MA (US); Anestis Panidis, Marlborough, MA (US); Jeffrey A. Lewis, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 376 days.

(21) Appl. No.: 11/478,897

(22) Filed: Jun. 30, 2006

(51) Int. Cl.
*G06F 3/06* (2006.01)
*G06F 12/00* (2006.01)
*G06F 13/00* (2006.01)
*G06F 13/28* (2006.01)

(52) U.S. Cl. .................... 711/4; 711/112; 711/173
(58) Field of Classification Search ............ None
See application file for complete search history.

(56) References Cited

U.S. PATENT DOCUMENTS 7,206,863 B1 * 4/2007 Oliveira et al. ............. 709/245

* cited by examiner

*Primary Examiner*—Reginald G Bragdon
*Assistant Examiner*—Baboucarr Faal
(74) *Attorney, Agent, or Firm*—Daly, Crowley, Mofford & Durkee, LLP (57) ABSTRACT

Methods and systems for preserving disk geometry when relabeling a data volume encapsulated in a virtual storage device that presents a different disk geometry than the data volume. An exemplary method includes maintaining information from a label of the data volume in a memory associated with the virtual storage device and intercepting a request for information related to a disk geometry of the encapsulated data volume that is normally answered without reference to the label. The request may be associated with a command to relabel the encapsulated data volume. The method also includes reporting the information from the label of the data volume related to the disk geometry of the data volume if the label is associated with an operating system that considers a geometry of a data volume when partitioning.

20 Claims, 7 Drawing Sheets

112 Data Volume Label

| ascii name | = <EMC-SYMMETRIX-5771 cyl 4600 alt 2 hd 15 sec 128> |
|---|---|
| pcyl | = 4602 |
| ncyl | = 4600 |
| acyl | = 2 |
| nhead | = 15 |
| nsect | = 128 |

| Part | Tag | Flag | Cylinders | Size | Blocks | |
|---|---|---|---|---|---|---|
| 0 | root | wm | 0 - 136 | 128.44MB | (137/0/0) | 263040 |
| 1 | swap | wu | 137 - 273 | 128.44MB | (137/0/0) | 263040 |
| 2 | backup | wu | 0 - 4599 | 4.21GB | (4600/0/0) | 8832000 |
| 3 | unassigned | wm | 0 | 0 | (0/0/0) | 0 |
| 4 | unassigned | wm | 0 | 0 | (0/0/0) | 0 |
| 5 | unassigned | wm | 0 | 0 | (0/0/0) | 0 |
| 6 | usr | wm | 274 - 4599 | 3.96GB | (4326/0/0) | 8305920 |
| 7 | unassigned | wm | 0 | 0 | (0/0/0) | 0 |

112 Information Normally Reported For Encapsulated Data Volume

```
ascii name  = <EMC-Invista-0100 cyl 55222 alt 2 hd 16 sec 10>
pcyl        = 55224
ncyl        = 55222
acyl        = 2
nhead       = 16
nsect       = 10
```

| Part | Tag | Flag | Cylinders | Size | Blocks | |
|---|---|---|---|---|---|---|
| 0 | root | wm | 0 - 1638 | 128.05MB | (1639/0/0) | 262240 |
| 1 | swap | wu | 1639 - 3277 | 128.05MB | (1639/0/0) | 262240 |
| 2 | backup | wu | 0 - 55221 | 4.21GB | (55222/0/0) | 8835520 |
| 3 | unassigned | wm | 0 | 0 | (0/0/0) | 0 |
| 4 | unassigned | wm | 0 | 0 | (0/0/0) | 0 |
| 5 | unassigned | wm | 0 | 0 | (0/0/0) | 0 |
| 6 | usr | wm | 3278 - 55221 | 3.96GB | (51944/0/0) | 8311040 |
| 7 | unassigned | wm | 0 | 0 | (0/0/0) | 0 |

112 Information Reported For Encapsulated Data Volume Consistent With Invention

```
ascii name  = <EMC-INVISTA-0100 cyl 4600 alt 2 hd 15 sec 128>
pcyl        = 4602
ncyl        = 4600
acyl        = 2
nhead       = 15
nsect       = 128
```

| Part | Tag        | Flag | Cylinders  | Size     | Blocks      |         |
|------|------------|------|------------|----------|-------------|---------|
| 0    | root       | wm   | 0 - 136    | 128.44MB | (137/0/0)   | 263040  |
| 1    | swap       | wu   | 137 - 273  | 128.44MB | (137/0/0)   | 263040  |
| 2    | backup     | wu   | 0 - 4599   | 4.21GB   | (4600/0/0)  | 8832000 |
| 3    | unassigned | wm   | 0          | 0        | (0/0/0)     | 0       |
| 4    | unassigned | wm   | 0          | 0        | (0/0/0)     | 0       |
| 5    | unassigned | wm   | 0          | 0        | (0/0/0)     | 0       |
| 6    | usr        | wm   | 274 - 4599 | 3.96GB   | (4326/0/0)  | 8305920 |
| 7    | unassigned | wm   | 0          | 0        | (0/0/0)     | 0       |

FIG. 7

METHODS AND SYSTEMS FOR PRESERVING DISK GEOMETRY OF VIRTUALIZED DATA VOLUMES

BACKGROUND

Some direct access electronic data storage devices are divided into blocks. "Block" and "sectors" are used interchangeably herein to refer to a data unit of 512 bytes. For ease of addressing, an electronic data storage device may designate a number of blocks as a head and a number of heads as a cylinder. Each such device may include a number of cylinders. Various manufacturers design their electronic data storage devices to designate different numbers of blocks as a head and different numbers of heads as a cylinder. Block size, on the other hand, is standardized among manufacturers. Thus, each of these electronic data storage devices must be able to identify the number of cylinders, the number of heads, and the number of sectors in the device. This information may be referred to as disk geometry or geometry information.

At least one operating system takes some of this information into account when partitioning a device. A "partition" is an area on a disk having a beginning and an end. "Partitioning" refers to the division of a storage device into a plurality of partitions, and the process of determining where such divisions will be. The SOLARIS operating system (OS), for example, partitions devices in terms of cylinders. The SOLARIS OS also reserves the last two cylinders of a device for its own use. The SOLARIS OS is available from Sun Microsystems Inc. Information on the disk geometry is stored together in a block known as the "label." The label is a data entity which describes what is on the device. The label may include the location and size of each partition in a device. The SOLARIS OS, for example, stores the label of an electronic data storage device in the first block of the device, and other areas toward the end of the device.

Some requests can be used to obtain current disk geometry information from a target storage device, without referring to the label of the target storage device. Such requests can be, for example, a command that uses a protocol called "SCSI" (Small Computer System Interface) to communicate between devices. Three SCSI commands can be used to obtain current disk geometry information from a target device without reference to the label of the storage device. The Mode Sense Page 3 command, for example, can be used to obtain the number of sectors in a head and the number of heads in a cylinder of the target device. Mode Sense Page 4 command can be used to obtain the number of cylinders in the target device. Read Capacity command can be used to obtain the number of sectors in the target device. The number of sectors in a target device also can be determined by multiplying the number of sectors in a head by the number of heads in a cylinder and by the number of cylinders in the device.

Today, users generally don't consider disk geometry when selecting a data volume. Instead, users generally consider the total storage capacity of the data volume as a whole. For example, a user may know that a data volume has 50 Gbytes of storage capacity, but likely will not know how that capacity is divided into cylinders, heads, and sectors within each head. Thus, a user may have data volumes with different disk geometries without knowing that these differences exist.

The inventors of the present invention recognized that the native disk geometry of a data volume can be different than the disk geometry presented by a virtual storage device into which the data volume has been imported. Examples of virtual storage devices include the INVISTA system, which includes the INVISTA application (offered by EMC Corporation of Hopkinton, Mass.) running on a storage and switch controller coupled to an intelligent multi-protocol switch.

SUMMARY OF EXEMPLARY EMBODIMENTS

Methods and systems are disclosed that relate to preserving disk geometry when relabeling a data volume encapsulated in a virtual storage device that presents a different disk geometry than the data volume.

One embodiment consistent with principles of the invention is a method for preserving disk geometry when relabeling a data volume encapsulated in a virtual storage device that presents a different disk geometry than the data volume. Prior to encapsulation, a label of the data volume includes information on the disk geometry of the data volume. This information may be needed to avoid problems relabeling the data volume after encapsulation. The method includes maintaining information from the label of the data volume in a memory associated with the virtual storage device and intercepting a request for information related to a disk geometry of the encapsulated data volume that is normally answered without reference to the label. The request may be associated with a command to relabel the encapsulated data volume. The method also includes reporting the information from the label of the data volume related to the disk geometry of the data volume if the label is associated with an operating system that considers a geometry of a data volume when partitioning.

Another embodiment consistent with principles of the invention is a system for preserving disk geometry when relabeling a data volume encapsulated in a virtual data volume that presents a different disk geometry than the data volume. The system includes an intelligent multi-protocol switch (IMPS), memory, and a controller. The controller uses the IMPS and metadata in memory to manage a data volume. The controller is configured to implement the foregoing method for preserving disk geometry when relabeling a data volume encapsulated in a virtual storage device that presents a different disk geometry.

Another embodiment consistent with principles of the invention is a computer-readable medium including instructions adapted to perform the foregoing method for preserving disk geometry when relabeling a data volume encapsulated in a virtual storage device that presents a different disk geometry than the data volume. The medium includes a program for installation and execution on a processor coupled to an intelligent switch.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference is now made in detail to exemplary embodiments of the invention, examples of which are illustrated in the accompanying drawings.

Figure 1:
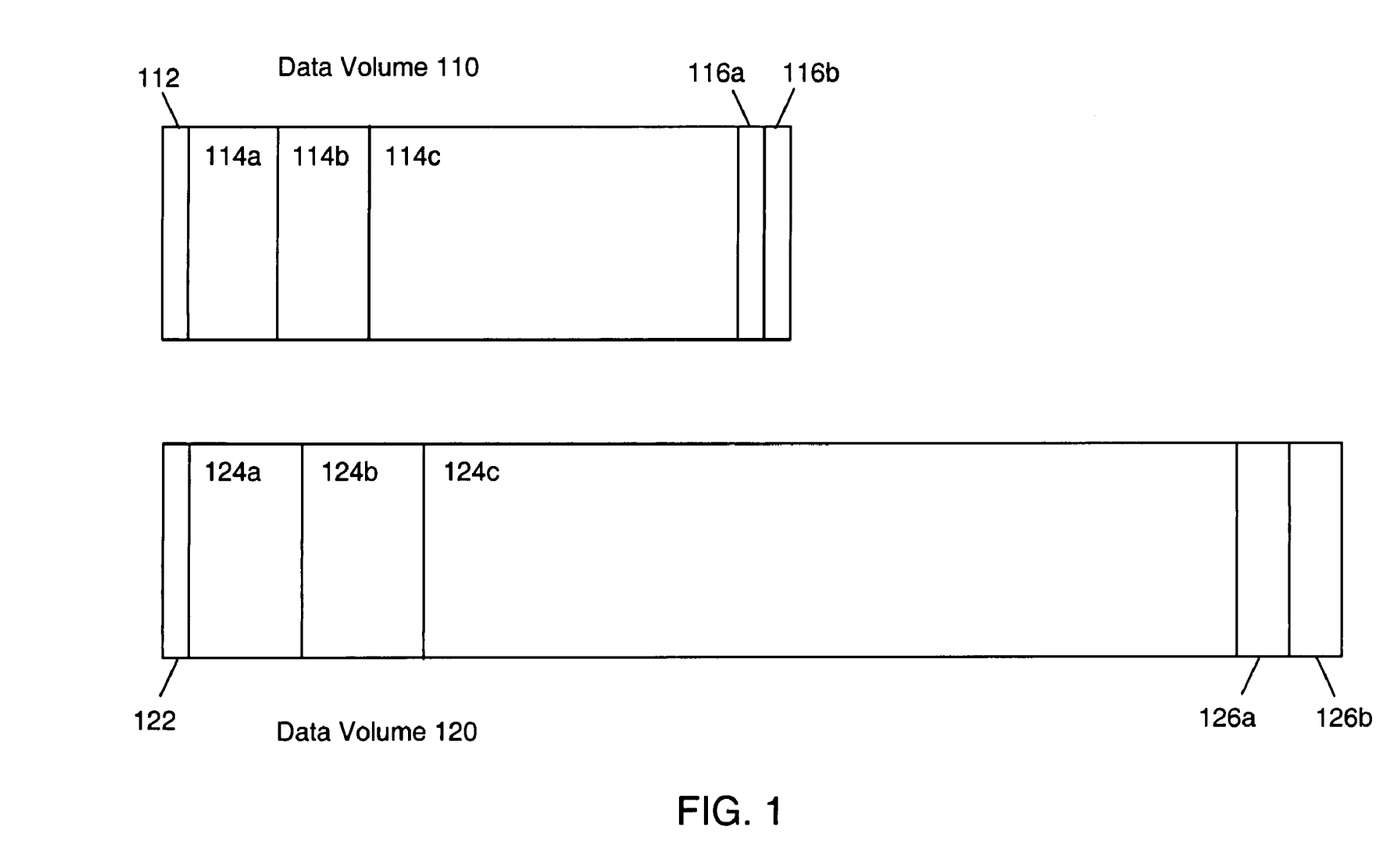
FIG. 1 illustrates two exemplary data volumes consistent with features and principles of the present invention.

FIG. 1 illustrates two exemplary data volumes 110 and 120 consistent with features and principles of the present invention. Both data volume 110 and data volume 120 are associated with an operating system that considers some disk geometry information when partitioning a data volume. In FIG. 1, for example, both data volumes are associated with the Solaris operating system and include a VTOC label in the first block of the data volume and two reserved cylinders at the end of the data volume. Data volume 110 includes label 112 and reserved cylinders 116a, 116b. Similarly, data volume 120 includes label 212 and reserved cylinders 216a, 216b.

As illustrated in FIG. 1, data volume 110 and data volume 120 have different geometries. Data volume 110 is smaller than data volume 120. For example, data volume 110 could be a CLARIION data storage system featuring 32,768 cylinders and 2,097,152 sectors of storage capacity, whereas data volume 120 could be a SYMMETRIX data storage system featuring 4,602 cylinders and 8,835,840 sectors of storage capacity. EMC Corporation of Hopkinton, Mass. offers the CLARIION and SYMMETRIX lines of data storage systems.

Similarly, data volume 110 could be an IBM FAStT data storage system and data volume 120 could be a HDS TagmaStore data storage system, where the FAStT system features less storage capacity than the TagmaStore system. The exemplary IBM FAStT data storage system features 512 bytes per sector, 128 sectors per track, and 15 tracks per cylinder, for a total of 1920 sectors per cylinder. The exemplary HDS TagmaStore data storage system features 512 bytes per sector, 512 sectors per track, and 512 tracks per cylinder, for a total of 7680 sectors per cylinder. The number of cylinders in both the FAStT system and the TagmaStore system would be determined by the total storage capacity of the system.

Although they have different sizes and geometries, both data volume 110 and data volume 120 can be configured to have the same number of partitions. FIG. 1 illustrates data volume 110 configured with two partitions thereby creating partitions 114a, 114b, and 114c. Similarly, FIG. 1 illustrates data volume 120 configured with two partitions thereby creating partitions 124a, 124b, and 124c. Since the operating system considers disk geometry information when partitioning a data volume and data volumes 110 and 120 have different geometries, the partitions in data volume 110 and data volume 120 do not correspond with one another on a block-by-block basis.

Figure 2:
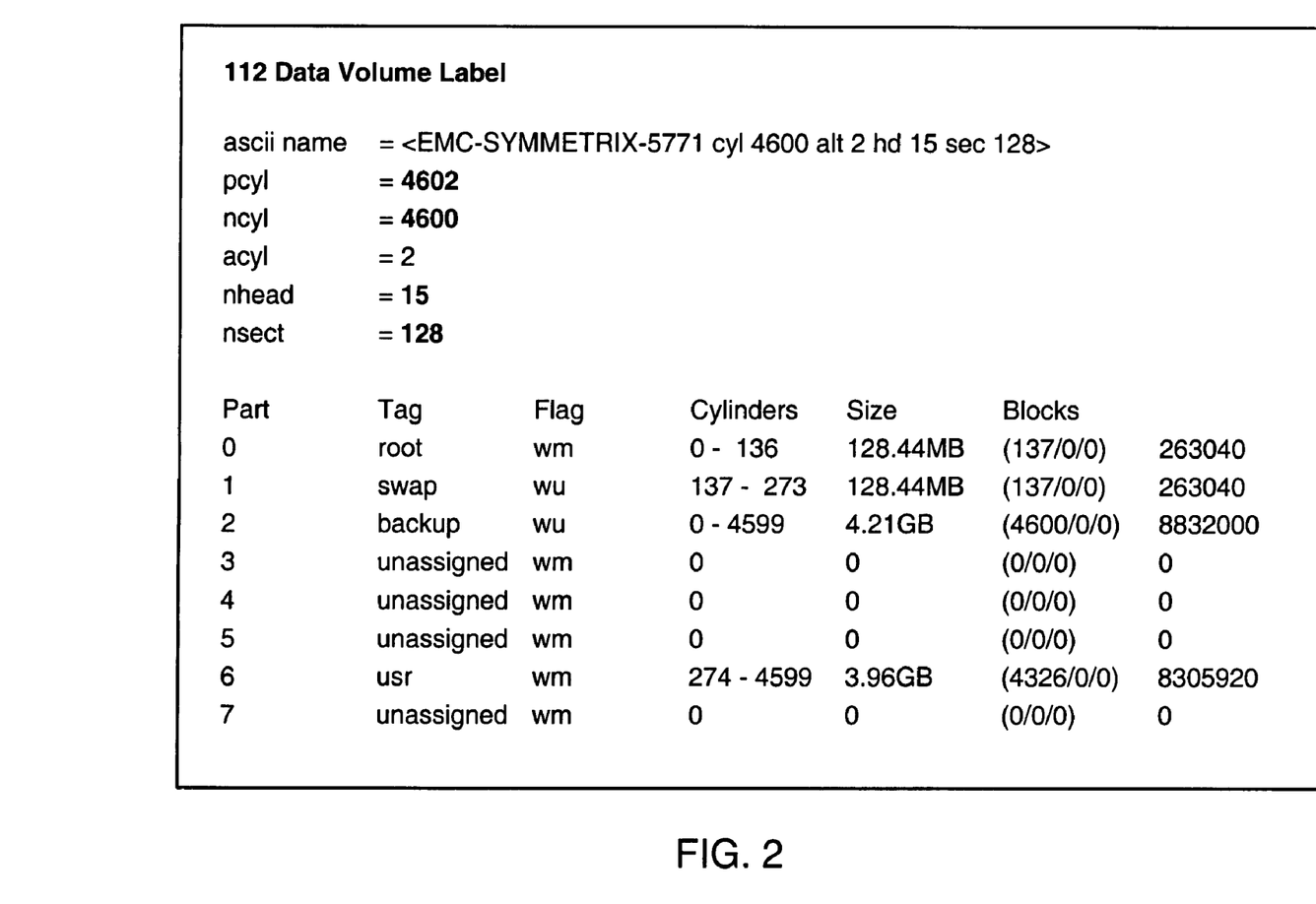
FIG. 2 illustrates an exemplary label of a data volume consistent with features and principles of the present invention.

FIG. 2 illustrates an exemplary label 112 of data volume 110 consistent with features and principles of the present invention. FIG. 2 may indicate, for example, geometry information based on the physical properties of data volume 110.

FIG. 2 in particular indicates the native disk geometry of data volume 110 where data volume 110 is a SYMMETRIX data storage system. FIG. 2 specifically indicates that data volume 110 includes 4,602 cylinders, 15 heads per cylinder, and 128 sectors per head. Thus, FIG. 2 indicates that data volume 110 includes 8,835,840 blocks of storage. Multiplying the number of blocks by the number of bytes in a block (512) gives you the total read capacity of a data volume.

Figure 3:
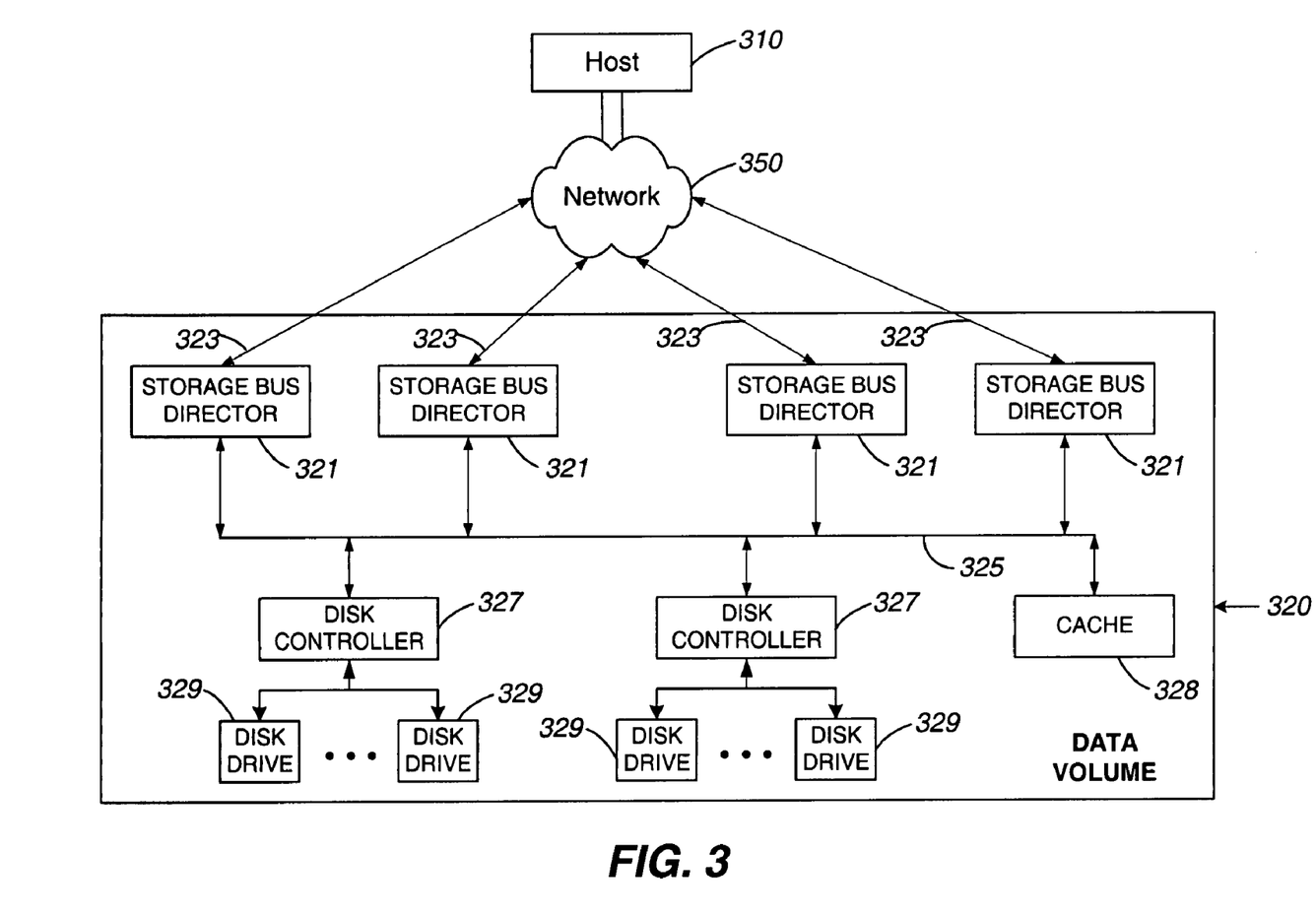
FIG. 3 illustrates an exemplary computer system including a data volume consistent with features and principles of the present invention.

FIG. 3 illustrates an exemplary computer system including a data volume consistent with features and principles of the present invention. The computer system of FIG. 3 includes at least one host 310 connected via network 350 to at least one data volume 320. The at least one data volume 320 serves the requests of the at least one host 320. FIG. 3 specifically illustrates one host 310 and one data volume 320.

In the example of FIG. 3, data volume 320 is the SYMMETRIX data storage system including label 112 of FIG. 2. Typically, data volume 320 will report the information from label 112 of FIG. 2 in response to a request for information related to the geometry of data volume 320. However, some requests obtain information related to the geometry of data volume 320 without referring to the label of the data volume.

Data volume 320 in FIG. 3 includes at least one storage bus director 323, a bus 325, a plurality of disk controllers 327, and a plurality of disk drives 329. Each storage bus director 323 controls communication between data volume 320 and other components on network 350. The storage bus directors 323 may be implemented as a SCSI driver to interact with other SCSI drivers where network 350 includes a SCSI bus. Alternatively, network 350 can be implemented as a fibre channel fabric. The storage bus directors 323, the disk controllers 327, and the disk drives 329 communicate over bus 325. Each disk controller 327 typically controls access to a plurality of disk drives 329.

Figure 4:
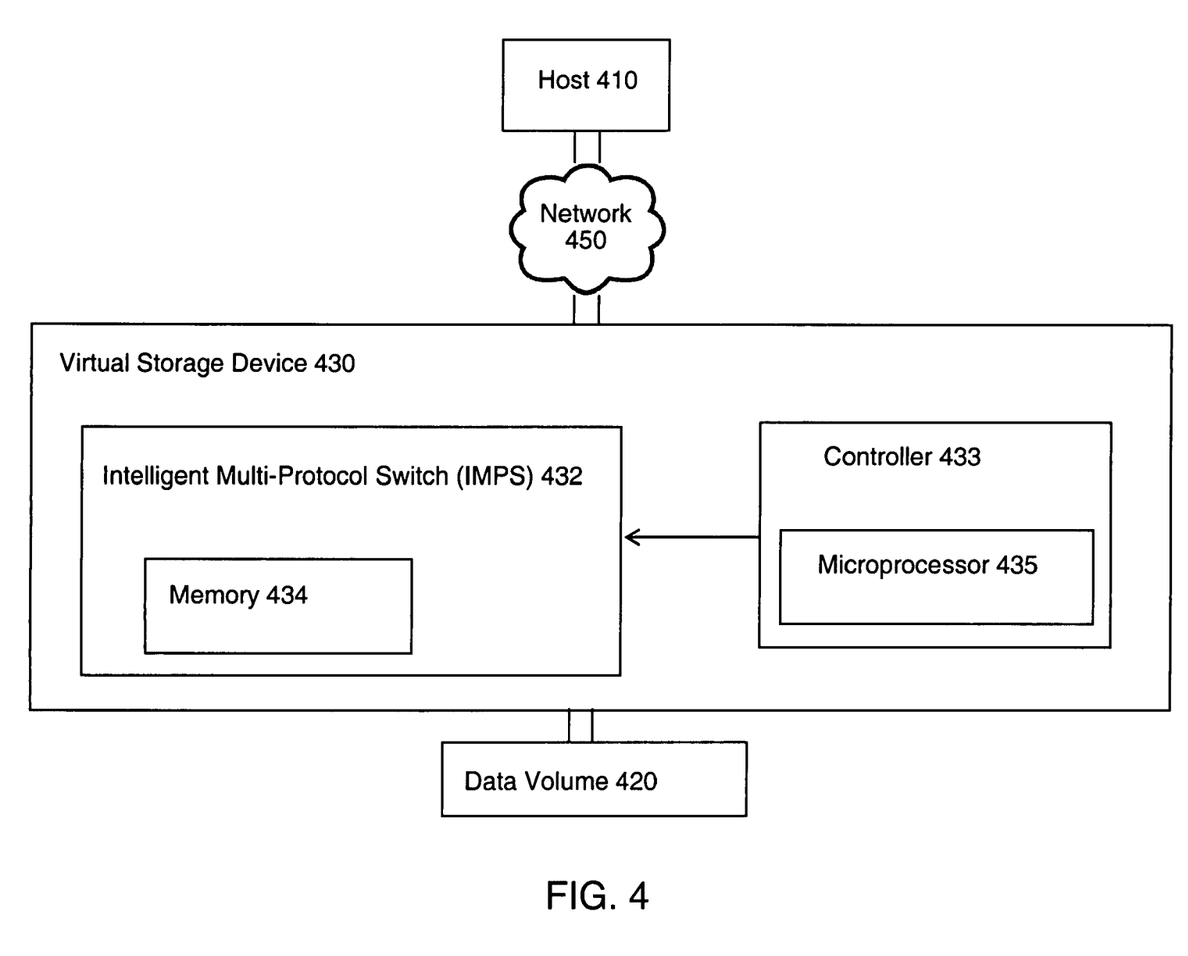
FIG. 4 illustrates an exemplary computer system consistent with features and principles of the present invention.

A user having a computer system architecture consistent with FIG. 3 may choose to add a virtual storage device level to the architecture thereby converting a computer system architecture consistent with FIG. 3 to one consistent with FIG. 4. The addition of a virtual storage device level between a network and an existing data volume may enable centralized and/or simplified data management. When a computer system is reconfigured to add the virtual storage device level, an existing data volume can be imported into the virtual storage device and the data volume is then considered "encapsulated" by the virtual storage device.

FIG. 4 illustrates an exemplary computer system consistent with features and principles of the present invention. FIG. 4 includes at least one host 410 connected via a network 450 and a virtual storage device 430 to at least one data volume 420. In particular, like FIG. 3, FIG. 4 includes one host 410 and one data volume 420. Other than virtual storage device 430, each of the other elements of FIG. 4 may be the same as or similar to those illustrated in and described with respect to FIG. 3. For example, data volume 420 can be the SYMMETRIX data storage system including label 112 of FIG. 2.

In the embodiment illustrated in FIG. 4, virtual storage device 430 includes an intelligent multi-protocol switch (IMPS) 432 including memory 434 for storing metadata related to data volume 420 and any other data volume incorporated into the computer system. Memory 434 can be any device for storing data, such as a disk array. Virtual storage device 430 also includes a controller 426 including at least one processor 435. Processor 435 can be any device capable of processing information, such as a microprocessor or a digital signal processor board. Controller 426 is configured to manage data volume 420 and any other data volume incorporated into the computer system using the metadata in memory 434 and IMPS 432. Virtual storage device 430 can be the INVISTA application (offered by EMC Corporation of Hopkinton, Mass.) running on an intelligent switch. Virtual storage device 430 can be a "Fabric_X Instance" such as described in U.S. patent application Ser. No. 10/810,988, entitled "System and Method for Managing Storage Networks and Providing Virtualization of Resources in Such a Network," filed on Mar. 26, 2004, the description of which is hereby incorporated by reference.

Figure 5:
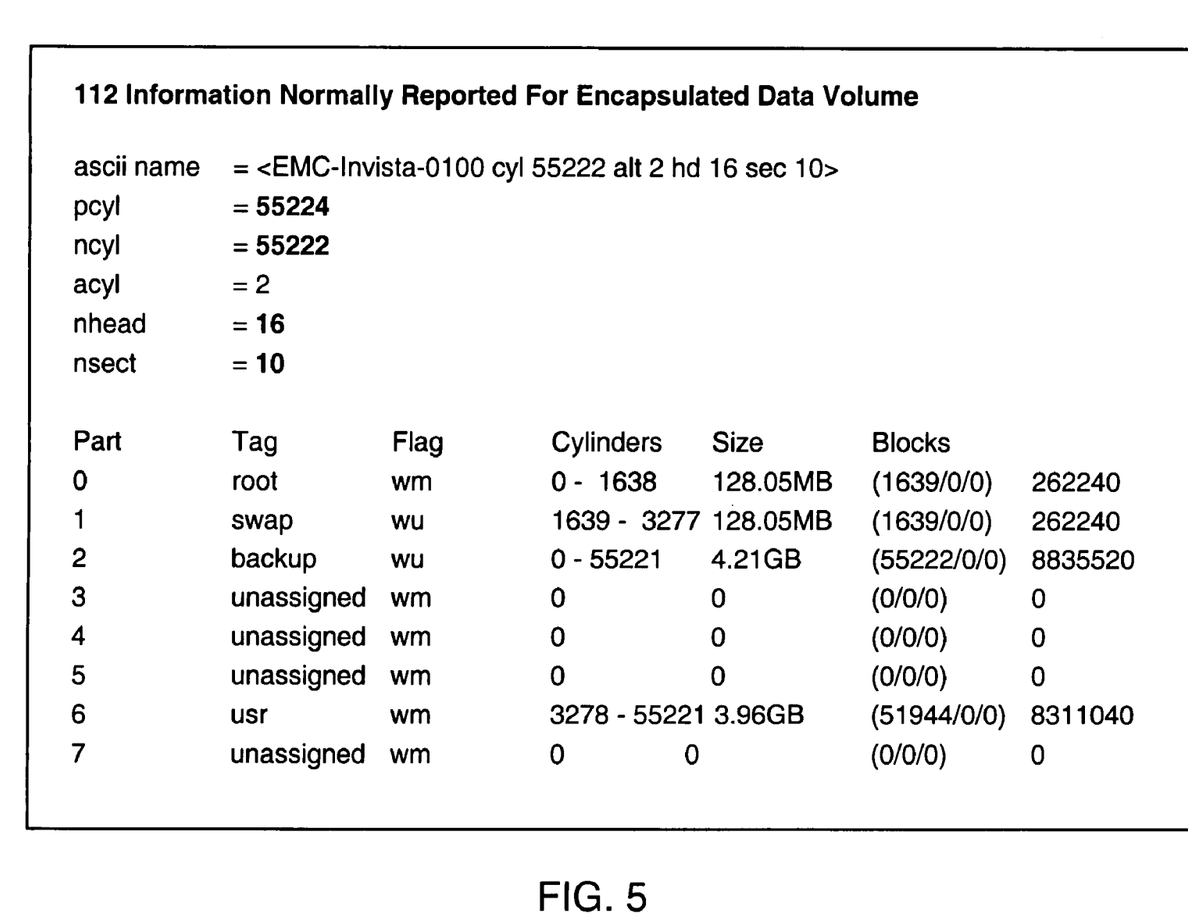
FIG. 5 illustrates exemplary information presented by a virtual storage device for the encapsulated data volume.

Although virtual storage device 430 has no physical disk geometry, it presents geometry information to host 410. This feature enables virtual storage device 430 to appear as a data volume to host 410. FIG. 5 indicates exemplary geometry information presented by virtual storage device 430. In particular, FIG. 5 indicates the geometry information presented by virtual storage device 430 for data volume 420 where data volume 420 has the native disk geometry indicated in FIG. 2. FIG. 5 specifically indicates that data volume 420 includes 55,224 cylinders (pcyl), 16 heads per cylinder (nhead), and 10 sectors per head (nsect).

The number of sectors per head (nsect) and the number of heads per cylinder (nhead) indicated in FIG. 5 are standard values for the exemplary virtual storage device 430. In contrast, virtual storage device 430 reports a number of cylinders (pcyl) calculated from the standard values and the geometry of the data volume 420 to ensure the total number of blocks reported for the encapsulated data volume is consistent with the actual number of blocks in the encapsulated data volume. Accordingly, like FIG. 2, FIG. 5 indicates that data volume 420 includes 8,835,840 blocks of storage. Thus, FIG. 5 indicates the same total read capacity for data volume 420 albeit with different geometry information.

In response to certain requests for geometry information, virtual storage device 430 will normally report the geometry information indicated in FIG. 5 without referring to the label of data volume 420. For instance, virtual storage device 430 will normally report geometry information indicated in FIG. 5 for data volume 420 in response to certain SCSI commands without referring to the label of data volume 420. In response to a Mode Sense 4 SCSI command, for example, virtual storage device 430 will normally report that there are 55,224 cylinders in data volume 420.

After importing data volume 420 into virtual storage device 430, a user may want to relabel data volume 420. In the context of this application, "relabeling" refers to modifying information normally included in a label of a data volume. Thus, when a user tries to modify information normally included in label 112 of data volume 110, the user is trying to relabel data volume 110. For example, the user may want to take add a new partition to data volume 420.

The inventors of the present invention recognized that an operating system that considers geometry information when partitioning a data volume may use the geometry information presented by the virtual storage device to build a new label when relabeling a data volume. As a comparison of FIG. 2 and FIG. 5 demonstrates, the geometry information presented by virtual storage device 430 can differ from the disk geometry of a data volume that is attached to network 450 via virtual storage device 430. Problems can arise when a user tries to relabel a data volume encapsulated in a virtual storage device that presents a different disk geometry than the data volume.

Where the geometry information presented by the virtual storage device differs from the geometry of the encapsulated data volume, an operating system that considers geometry information when partitioning a data volume will put the partitions in the locations dictated by the reported geometry and not maintain the partitions included in the data volume.

Figure 6:
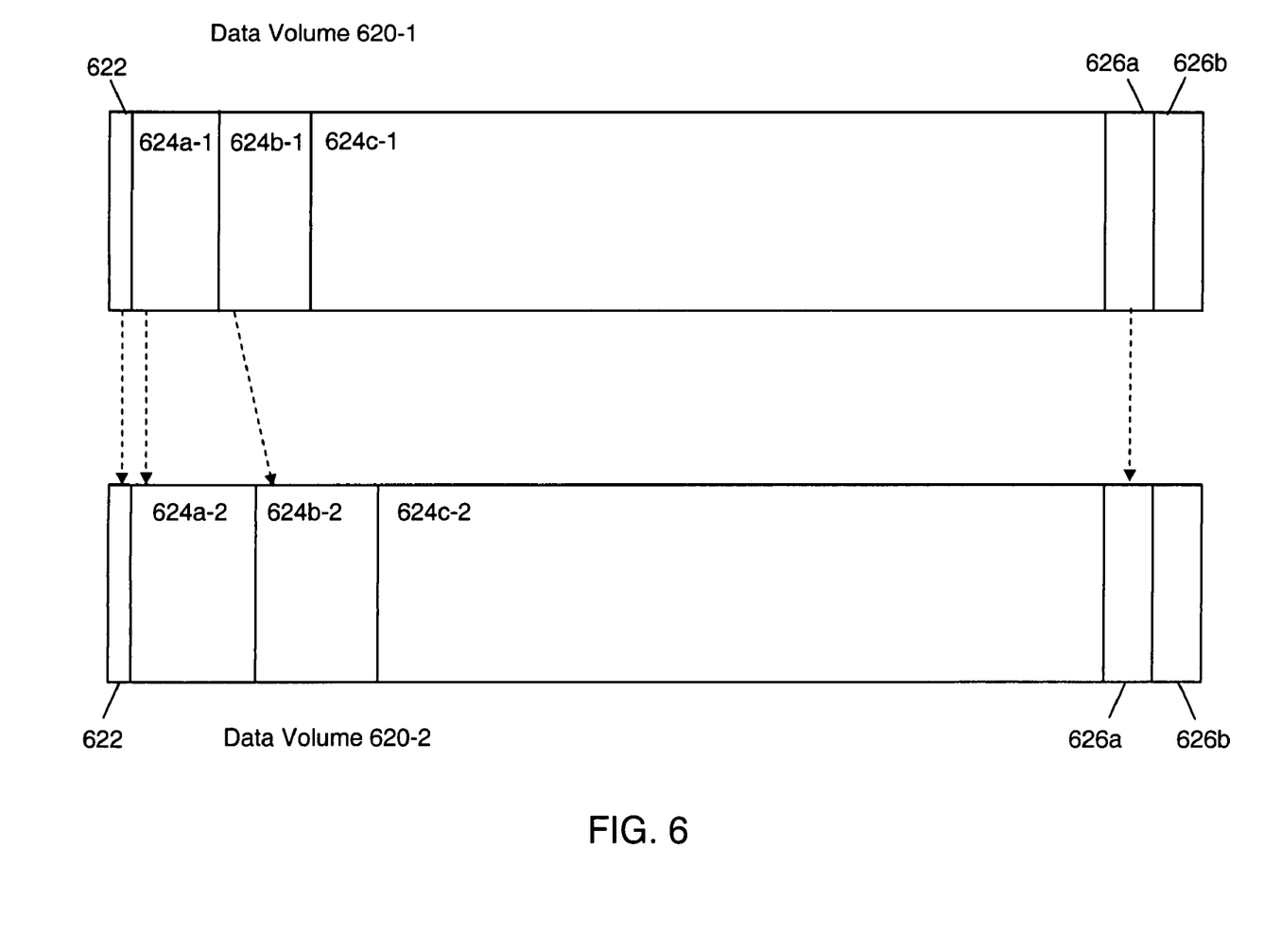
FIG. 6 illustrates one data volume with different partition locations based on different geometry information.

FIG. 6 illustrates the problem that arises when an operating system that considers geometry information puts the partitions in the locations based on the reported geometry versus the native geometry.

In particular, FIG. 6 illustrates one data volume 620 with different partition locations based on different geometry information. Data volume 620 includes label 622 and reserved cylinders 626a, 626b. In FIG. 6, data volume 620 is designated data volume 620-1 when it includes partitions based on its native geometry information. Similarly, data volume 620 is designated data volume 620-2 when it includes partitions based on reported geometry information that differs from the native geometry of data volume 620.

If a user wants to access data that is in the third block of partition 624b-1 of data volume 620-1, the operating system will first need to identify the beginning of the partition 624b-1. Moreover, the operating system will be unable to locate the data that was in the third block of partition 624b-1 without first identifying the beginning of the partition. The partition location information may be included in label 622 of data volume 620-1. Label 622 of data volume 620-1, for example, can include the information indicated in FIG. 2. The partition location information may also be recreated from the native geometry of data volume 620-1. Once data volume 620 is imported, virtual storage device 430 may maintain the native geometry and partition location information as metadata associated with data volume 620. Importing data volume 620 does not move the partitions. Thus, after data volume 620 is imported, the operating system can still identify the beginning of the partition 624b-1. Accordingly, the operating system can still access data in the third block of partition 624b-1 of data volume 620-1.

In response to a request for information related to the geometry of data volume 620, however, virtual storage device 430 may not reference label 622 of data volume 620-1 or the metadata associated with data volume 620. Instead, virtual storage device 430 can report geometry information that differs from the native geometry of data volume 620. For example, virtual storage device 430 can report the geometry information indicated in FIG. 5. When a user tries to relabel data volume 620 with an operating system that considers the geometry of the data volume when partitioning, the operating system can use the reported information when partitioning data volume 620. Thus, as illustrated by data volume 620-2, the operating system can create different partitions than it would have if it were using the native geometry of data volume 620. If a user wants to access data that is in the third block of partition 624b-1 of data volume 620-1 in relabeled data volume 620-2, the operating system may access the wrong data because the relevant partition has been relocated. Thus, the data on the data volume 620-2 may effectively be corrupted.

The inventors of the present invention have identified these problems and methods and systems for preserving disk geometry when relabeling an encapsulated data volume in a virtual storage device that presents different disk geometry than the data volume. Consistent with features and principles of the present invention, a virtual storage device maintains geometry information from the label of an encapsulated data volume in memory. The virtual storage device then intercepts any request for information related to the geometry of the encapsulated data volume that is normally answered without reference to the label or information from the label. In response to the request, the virtual storage device reports information from the label of the data volume if the label is associated with an operating system that considers data volume geometry when partitioning. Thus, geometry of the encapsulated data volume will be preserved when it is relabeled.

In an embodiment of the invention consistent with FIG. 4, virtual storage device 430 maintains information related to the geometry of the encapsulated data volume in memory. Virtual storage device 430, for example, can maintain the number of sectors per head (nsect), the number of heads per cylinder (nhead), and the number of cylinders (pcyl) for a data volume having the native geometry described in FIG. 5 in metadata associated with data volume 420. Virtual storage device 430 can additionally maintain the number of cylinders that are not reserved for use by the operating system (ncyl). Moreover, virtual storage device 430 can maintain information related to the existing partitions in data volume 420. The foregoing information can be stored in metadata for data volume 420. Such information can be stored, for example, when data volume 420 is imported into virtual storage device 430. Additionally or alternatively, the user can trigger the storage of such information.

Virtual storage device 430 then intercepts any request for information related to the geometry of data volume 420 that is normally answered without reference to the label or information from the label. In fact, virtual storage device 430 may only refer to the metadata for data volume 420 in response to any request for information related to the geometry of data volume 420.

Figure 7:
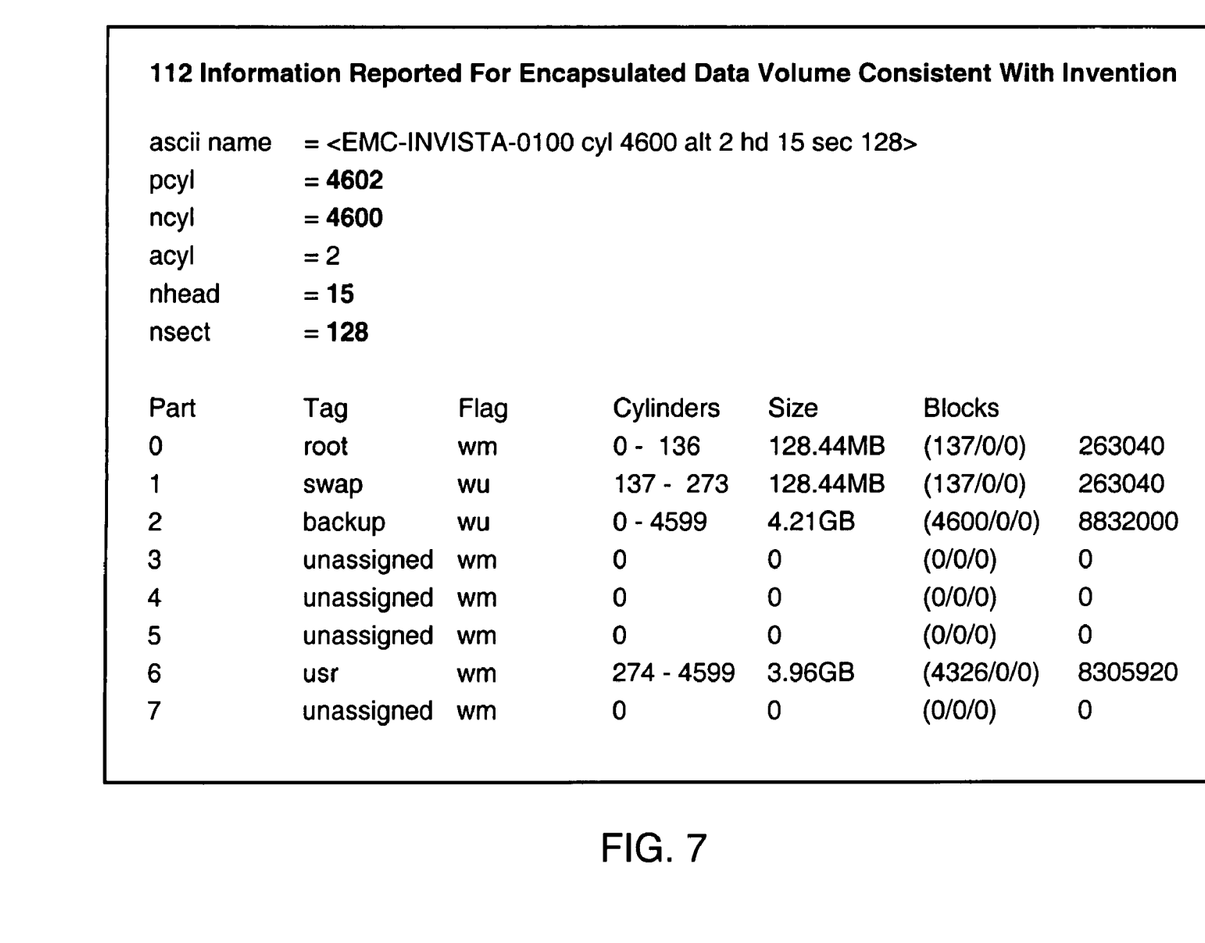
FIG. 7 illustrates exemplary information presented by a virtual storage device for the encapsulated data volume consistent with features and principles of the present invention.

If the label is associated with an operating system that considers data volume geometry when partitioning, virtual storage device 430 will report information related to the disk geometry of the encapsulated data volume instead of the information normally presented by virtual storage device 430. For example, virtual storage device 430 can report the information related to the geometry of data volume 420 indicated in FIG. 7.

Virtual storage device 430 may determine if a label of data volume 420 is associated with an operating system that considers data volume geometry when partitioning at anytime before reporting information related to the geometry of data volume 420. In one embodiment, virtual storage device 430 makes the determination when first reading the label of data volume 420. In this embodiment, virtual storage device 430 can store the information related to the geometry of data volume 420 indicated in FIG. 7 as metadata for data volume 420. In this case, virtual storage device 430 can report the requested information from the metadata for data volume 420. For instance, in response to a Mode 4 SCSI command, virtual storage device 430 can report that data volume 420 features 4,602 cylinders by reference to the metadata for data volume 420. In another embodiment, virtual storage device 430 makes the determination after receiving a request for information related to the geometry of data volume 420 that is normally answered without reference to the label or information from the label. In this embodiment, virtual storage device 430 can read the label of data volume 420 before reporting the information related to the geometry of data volume 420. Thus, although virtual storage device 430 normally reports a different disk geometry than data volume 320, the geometry of the encapsulated data volume 420 will be preserved when it is relabeled.

One of ordinary skill in the art will appreciate that features and principles of the present invention may be implemented in a computer-readable medium (e.g., floppy disk, CD-ROM, storage device, etc.) containing instructions, which may be executed by virtual storage device 430, when relabeling a data volume encapsulated in a virtual storage device that presents different disk geometry, to preserve the disk geometry on the label of a data volume that includes data on the disk geometry of a previous data volume. One of ordinary skill in the art will appreciate that features and principles of the present invention may be implemented in different elements of virtual storage device 430. One of ordinary skill in the art will also appreciate that features and principles of the present invention may be implemented in another intelligent switch configured to create a virtual storage layer.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for preserving disk geometry when relabeling a data volume encapsulated in a virtual storage device that presents a different disk geometry than the data volume, the method comprising:
   maintaining information from a label of the data volume in a memory associated with the virtual storage device;
   intercepting a request for information related to a disk geometry of the encapsulated data volume that is normally answered without reference to the label; and
   if the label is associated with an operating system that considers a geometry of a data volume when partitioning, reporting information from the label of the data volume in response to the request.

2. The method of claim 1 further comprising storing information from the label of the data volume in a memory associated with the virtual storage device when the data volume is encapsulated in the virtual storage device.

3. The method of claim 1 wherein the memory associated with the virtual storage device comprises a disk array for storing metadata related to at least one data volume.

4. The method of claim 1 wherein the request for information related to a disk geometry of the encapsulated data volume comprises a Mode Sense 3 SCSI command.

5. The method of claim 4 wherein reporting information from the label of the data volume in response to the request comprises reporting a number of sectors in a head and a number of heads in a cylinder of the data volume.

6. The method of claim 1 wherein the request for information related to a disk geometry of the encapsulated data volume comprises a Mode Sense 4 SCSI command.

7. The method of claim 6 wherein reporting information from the label of the data volume in response to the request comprises reporting a number of cylinders in the data volume.

8. The method of claim 1 wherein the request for information related to a disk geometry of the encapsulated data volume comprises a Read Capacity 3 SCSI command.

9. A system for preserving disk geometry when relabeling a data volume encapsulated in a virtual storage device that presents a different disk geometry than the data volume, the system comprising:
   an intelligent multi-protocol switch (IMPS);
   a memory for storing metadata related to at least one data volume; and
   a controller coupled to the IMPS and the memory, wherein the controller comprises a processor configured to manage the at least one data volume using the metadata and the IMPS, and wherein the controller is configured to implement a method for preserving disk geometry when relabeling a physical device encapsulated in a virtual storage device that presents a different disk geometry, the method comprising:

maintaining information from a label of the data volume in a memory associated with the virtual storage device;

intercepting a request for information related to a disk geometry of the encapsulated data volume that is normally answered without reference to the label; and     if the label is associated with an operating system that considers a geometry of a data volume when partitioning, reporting information from the label of the data volume in response to the request.

10. The system of claim 9 wherein the method further comprises storing information from the label of the data volume in the memory coupled to the controller when the data volume is encapsulated the virtual storage device.

11. The system of claim 9 wherein the memory coupled to the controller comprises a disk array for storing metadata related to at least one data volume.

12. The system of claim 9 wherein the request for information related to a disk geometry of the encapsulated data volume comprises a Mode Sense 3 SCSI command and wherein reporting information from the label of the data volume comprises reporting a number of sectors in a head and a number of heads in a cylinder of the data volume.

13. The system of claim 9 wherein the request for information related to a disk geometry of the encapsulated data volume comprises a Mode Sense 4 SCSI command and wherein reporting information from the label of the data volume comprises reporting a number of cylinders in the data volume.

14. The system of claim 9 wherein the request for information related to a disk geometry of the encapsulated data volume comprises a Read Capacity SCSI command.

15. A computer-readable medium comprising programmable instructions adapted to perform a computer-implemented method for preserving disk geometry when relabeling a data volume encapsulated in a virtual storage device that presents a different disk geometry than the data volume, the method comprising:

maintaining information from a label of the data volume in a memory associated with the virtual storage device;

intercepting a request for information related to a disk geometry of the encapsulated data volume that is normally answered without reference to the label; and     if the label is associated with an operating system that considers a geometry of a data volume when partitioning, reporting information from the label of the data volume in response to the request.

16. The medium of claim 15 wherein the method further comprises storing information from a label of the data volume in a memory coupled to the virtual storage device when the data volume is encapsulated in the virtual storage device.

17. The medium of claim 16 wherein the memory coupled to the virtual storage device comprises a disk array for storing metadata related to at least one data volume.

18. The medium of claim 15 wherein the request for information related to a disk geometry of the encapsulated data volume comprises a Mode Sense 3 SCSI command and wherein reporting information from the label of the data volume comprises reporting a number of sectors in a head and a number of heads in a cylinder of the data volume.

19. The medium of claim 15 wherein the request for information related to a disk geometry of the encapsulated data volume comprises a Mode Sense 4 SCSI command and wherein reporting information from the label of the data volume comprises reporting a number of cylinders in the data volume.

20. The medium of claim 15 wherein the request for information related to a disk geometry of the encapsulated data volume comprises a Read Capacity SCSI command.

\* \* \* \* \*